Aug. 25, 1970 — L. E. ATTERHOLT — 3,525,924

GENERATOR VOLTAGE REGULATOR UTILIZING TIME RATIO CONTROL

Filed April 1, 1968 — 2 Sheets-Sheet 1

INVENTOR

LAWRENCE E. ATTERHOLT

BY Marshal, Biebel, French & Bugg
ATTORNEYS

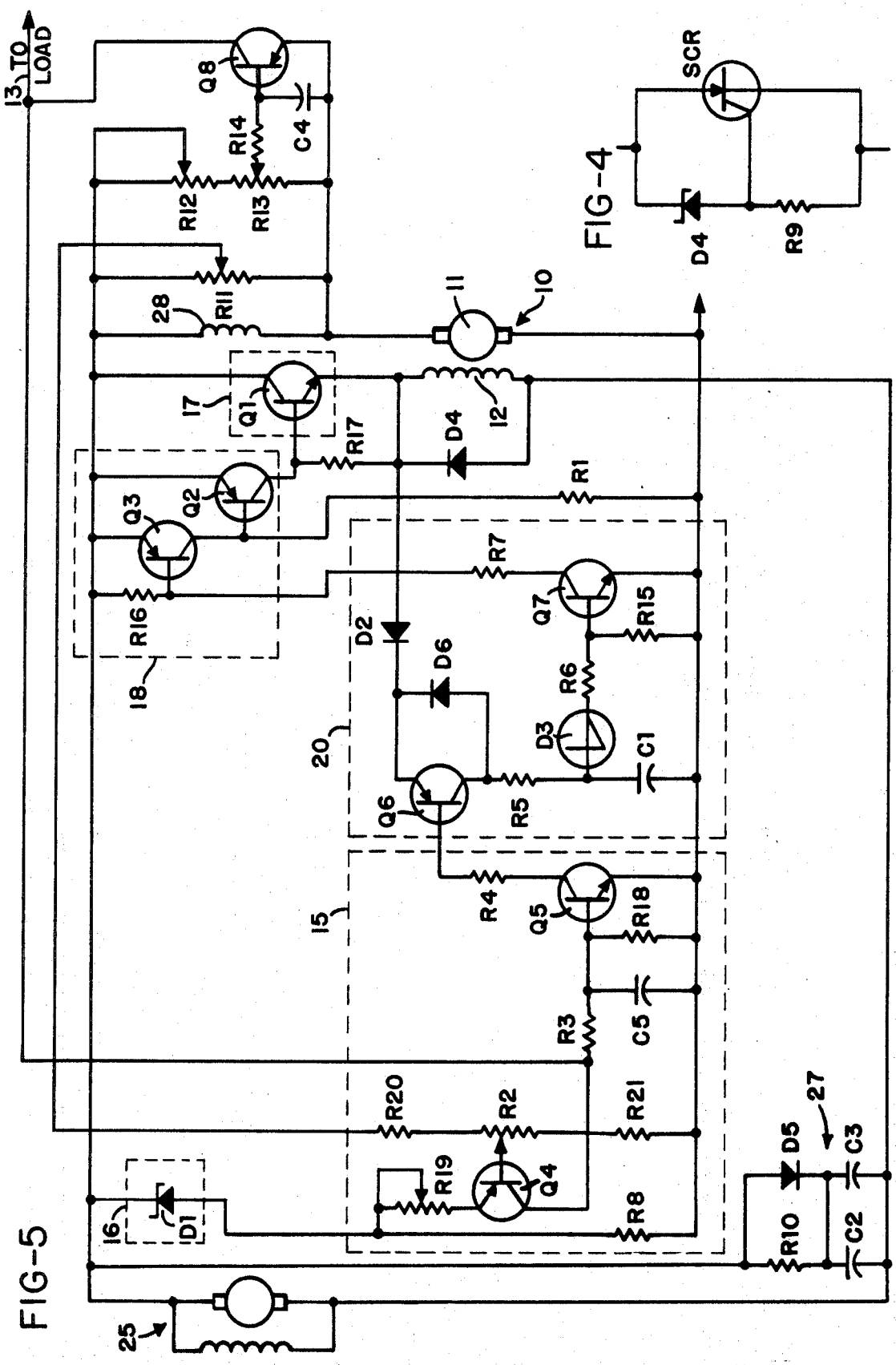

United States Patent Office 3,525,924
Patented Aug. 25, 1970

---

3,525,924
GENERATOR VOLTAGE REGULATOR UTILIZING TIME RATIO CONTROL
Lawrence E. Atterholt, Troy, Ohio, assignor to Hobart Brothers Company, Troy, Ohio, a corporation of Ohio
Filed Apr. 1, 1968, Ser. No. 717,670
Int. Cl. H02p 9/30
U.S. Cl. 322—28
8 Claims

ABSTRACT OF THE DISCLOSURE

A regulator for controlling the voltage output from a generator includes a switching element in series with the field winding of the generator to control the current therethrough and thus the voltage output of the generator. A comparator circuit senses the difference between a reference voltage and the output from the generator to control a time ratio device having a fixed off time, which is short compared to the generator field circuit time constant, and an on time which is determined by the difference in voltages. An increase in the generator voltage output above a predetermined level will cause the on time of the switching element to decrease, thus changing the ratio between the on time and the off time of the current through the field winding, thereby returning the voltage output from the generator to the predetermined level.

BACKGROUND OF THE INVENTION

Voltage regulators have been applied to control the current through the field winding of a DC generator by switching a power transistor alternately on and off with the control being effected by varying the average generator field power by varying the ratio of transistor on time to its off time. This mode of control is identified as varying frequency time ratio control.

Several control schemes have been devised for time ratio control using series switching elements in the field winding of DC generators. Each of these control schemes consists of a series control element, an amplifier to drive the control element, a time ratio control for the driver amplifier, a source of reference voltage, and a device for controlling the time ratio control in response to the difference in the voltage output from the generator and the reference voltage.

Several types of time ratio controlled circuits have been used previously, one of which employs a saturable magnetic core device for generating symmetrical AC pulses in a square wave oscillator with the pulse width controlling a magnetic amplifier. Another time ratio controlled circuit employs a variable width pulse oscillator which includes a unijunction transistor oscillator driving a bistable flip-flop circuit with a capacitor charging at variable rates from alternate sides of the flip-flop to control the pulse width. Still another example is a saturable core magnetic system which uses a saturable core transformer in series with the output of the generator for controlling the switching pulses. A fourth example makes use of an asymmetrical multivibrator for the generation and control of the switching pulses.

Each of the prior art devices is more expensive than the present invention, and most of these devices are more complicated.

SUMMARY OF THE INVENTION

This invention relates to a method for regulating the voltage output of a generator and a regulator apparatus for producing a square wave output having a first output of a constant time period and a second output for a time period which is inversely proportional to a voltage input.

The apparatus of this invention is particularly useful for controlling the voltage output from a generator, or any application where the control or regulation of voltage and current is required.

This invention is particularly useful as a time ratio control circuit used in conjunction with a switching element to control the current through a field winding of a generator. The time ratio control switches the field winding off for a fixed interval, which is kept short compared to the generator field circuit time constant to minimize modulation of the generator voltage by the regulator circuit, with the on time of the time ratio control circuit being determined by the voltage output desired from the generator. A feedback circuit is provided to maintain this voltage constant, with the feedback circuit including a source of reference voltage and means to compare the output of the generator to the reference voltage.

The time ratio control circuit of this invention incorporates a capacitor which is charged at a rate determined by the difference between the output of the generator and the reference voltage, with the charge on the capacitor being sensed by a voltage sensitive means which conducts when the charge on the capacitor reaches a predetermined level and which also provides a path for discharging the capacitor during the time the voltage sensitive means is in the conducting state. The discharge path is essentially constant and therefore the time during which the voltage sensitive means conducts is constant. The voltage sensitive means will return to its non-conducting state when the charge on the capacitor decreases below a second predetermined level allowing the capacitor to resume charging at a rate determined by the difference between the voltage output of the generator and the reference voltage.

The particular circuitry used for the time ratio control circuit of this inveniton employs conventional transistors and other circuit components, is less costly than the conventional saturable magnetic core systems, and as designed here, will fail safe in the most common failure mode of the majority of its components.

It is therefore an object of this invention to provide an improved voltage responsive apparatus as described above for producing a square wave output having a constant first time period and a variable second time period, the apparatus being inexpensive to manufacture and more reliable than prior art devices; to provide a voltage responsive apparatus employing a capacitor which charges at a rate proportional to a flow of current determined by the difference between a voltage input and a reference voltage, voltage sensitive means, such as a four layer diode or its equivalent circuit, connected to the capacitor which conducts when the charge on the capacitor reaches a predetermined level, the voltage sensitive means providing a path to discharge the capacitor at a rate which is independent of the input voltage, and an output means responsive to the voltage sensitive means to provide a square wave output having a first time period which is constant and which is controlled by the time constant of the discharge path for the capacitor, and a second output which is affected by the charging rate of the capacitor as determined by the difference between the input voltage and the reference; and to provide a method and apparatus for regulating the voltage output of a generator by controlling the flow of current through the generator field winding by a variable time ratio device, as described above, with the off time of the current through the field winding being constant and short compared to the generator field circuit time constant to minimize modulation of the generator output voltage by the switching of the regulator apparatus, and with the on time of the field current being determined by the voltage output desired from the generator.

BRIEF DESCRIPTION OF THE DRAWINGS

FIG. 4 shows an equivalent circuit for a four layer diode which may be used as the voltage sensitive means in the regulator apparatus of this invevntion; and FIG. 5 is a detailed electrical schematic diagram of a commercial embodiment of the regulator apparatus constructed according to this invention further including voltage spike suppression, and line drop compensation, with generator current limiting circuits incorporated into the basic regulator circuit.

DESCRIPTION OF THE PREFERRED EMBODIMENT

Figure 1:
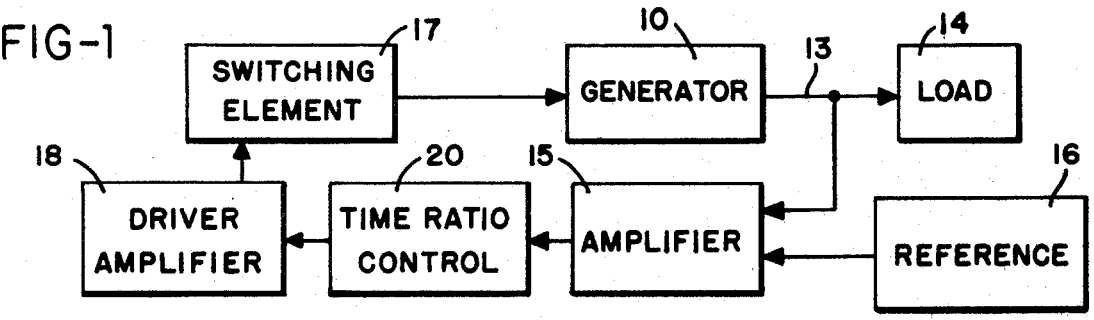
FIG. 1 is a block diagram showing generally the elements comprising a regulator apparatus for controlling the voltage output from a generator.
Figure 2:
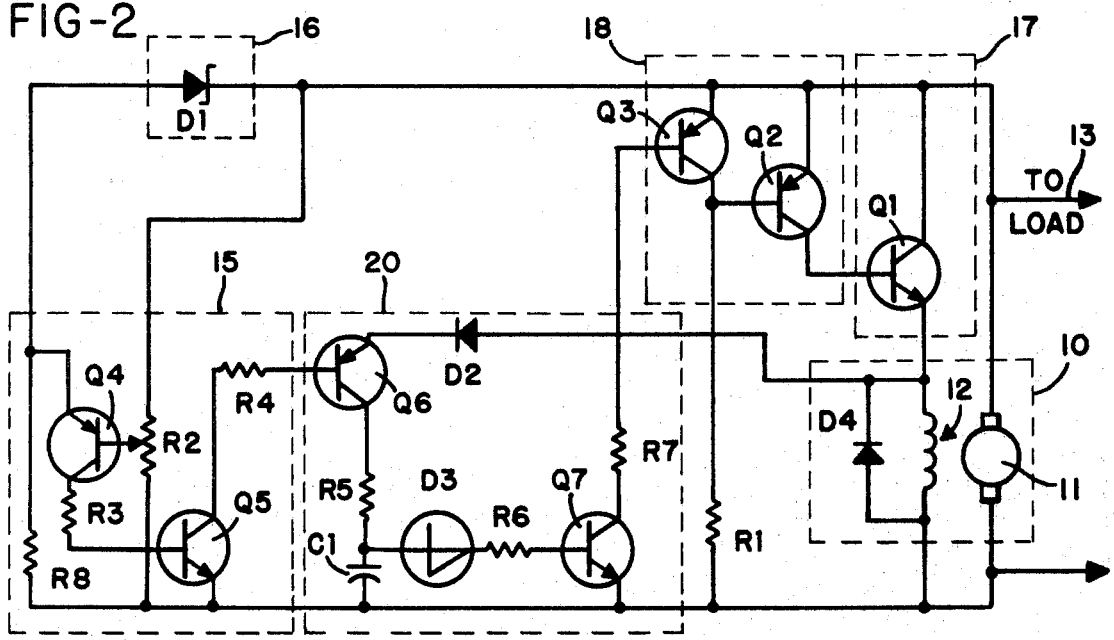
FIG. 2 is a simplified electrical schematic diagram of the regulator apparatus of this invention.

Reference is now made to the drawings and particularly to the block diagram of FIG. 1 and the simplified electrical schematic diagram of FIG. 2, both figures showing the voltage regulator apparatus of this invention. A generator 10, including an armature 11 and a field winding 12, provides an output on line 13 to a load 14. The voltage output of the generator is monitored by an amplifier 15 and compared to a source of reference voltage 16.

A switching element 17 is placed in series with an inductance, i.e., the field winding 12 of the generator 10 to control the current therethrough and thus to control the output voltage of the generator. In this invention, the current through the field winding is either completely on or completely off, with the field current being controlled by a transistor switching element. The switching element 17 is controlled by a driver amplifier 18 which is connected to a time ratio control circuit 20. In this invention, the time interval that the generator field is switched off is kept at a constant value which is short compared to the generator field circuit time constant so that minimum modulation of the generator voltage output results from the regulator switching cycle. For use in aircraft ground power units, it is desirable to maintain the off time less than ten percent of the generator field time constant. In other applications, an off time of as much as twenty-five percent may be acceptable, the primary consideration being the amount of modulation which can be tolerated in the output voltage from the generator. The time interval the generator field is switched on will depend on the voltage output desired from the generator.

The switching element 17 consists of a power transistor Q1 having its collector and emitter elements in series with the generator field winding 12. Switching element transistor Q1 is controlled by the driver amplifier 18 consisting of transistors Q2 and Q3 with transistor Q2 being biased into saturation by resistor R1 whenever transistor Q3 is in the non-conducting state. With transistor Q2 gated on, transistor Q1 will also be gated into the conducting state to allow current to flow through the generator field winding.

The source of reference voltage 16 includes a Zener diode D1 which applies its reference voltage to the emitter element of transistor Q4, with the base element of that transistor connected to the slider of potentiometer R2. Transistor Q4 is therefore a comparison means for comparing the generator output voltage to the reference voltage and produces a signal which is proportional to the difference between the voltage established by the slider of resistor R2 and the reference. This signal is applied through resistor R3 to the base of transistor Q5 which amplifies this signal and applies it through resistor R4 to the base electrode of transistor Q6 in the time-ratio control circuit 20.

With current flowing in the generator field winding 12, current also flows through diode D2, transistor Q6, and resistor R5, to charge the capacitor C1 at a variable rate determined by the impedance of transistor Q6. Capacitor C1 will therefore charge at a rate proportional to the difference between the voltage output of the generator 10 and the reference voltage from D1. As the charge builds up and reaches the firing voltage of a voltage sensitive means, which, in this embodiment is a four-layer or Shockley diode D3, this diode will change from a non-conducting to the conducting state. When diode D3 conducts, current will then flow through resistor R6 and through the base-emitter junction of the time ratio control output transistor Q7 to gate transistor Q7 into the conducting state.

Transistor Q7 functions to accomplish two purposes. The first purpose is to provide a first output of a constant predetermined time interval which is used to open the generator field circuit. This is accomplished by causing current to flow through resistor R7 to gate transistor Q3 into the conducting state, shunting the emitter to base junction of transistor Q2 thereby gating transistor Q1 into the non-conducting state and removing the source of current to the generator field. Generator field current, sustained by the field inductance, continues to flow through the path provided by diode D4.

The second purpose of transistor Q7 is to provide a discharge path for capacitor C1 through the diode D2 and resistor R6. When the charge on capacitor C1 decreases below the value required to keep diode D3 in the conducting state, the diode will revert to its blocking or non-conducting state. When diode D3 ceases conducting, transistors Q7 and Q3 will be gated off, allowing transistors Q2 and Q1 to turn on to begin the next switching cycle. Thus capacitor C1 will resume charging at a rate determined by the impedance of transistor Q6. The time required for capacitor C1 to discharge below the voltage required to sustain the four layer diode current above its holding level is essentially constant for any given set of components which means that the period during which transistor Q1 is gated off is constant for each switching cycle.

The time required for capacitor C1 to charge to the firing voltage of the four layer diode D3 is determined by the magnitude of the current permitted to flow through Q6 which is controlled by the amplifier or comparator means 15. If the generator voltage rises above the level as determined by the setting of the slider on potentiometer R2, the potential at the base of transistor Q4 decreases with respect to its emitter which is clamped to a fixed potential by Zener diode D1. The current through transistor Q4 increases the current through the base of transistor Q5 causing the base current of transistor Q6 also to increase. Therefore, transistor Q6 conducts a higher charging current to capacitor C1 which shortens the time required for capacitor C1 to reach the firing voltage of the four layer diode D2 and therefore the time period for which transistor Q1 is in the conducting state becomes shorter. The resulting decrease of the conducting or on time of transistor Q1 with respect to its non-conducting or off time reduces the average generator field power to the level required to maintain generator voltage at the level determined by the setting of the slider on potentiometer R2.

On the other hand, if the generator voltage decreases below its regulated value, the base potential of transistor Q4 rises with respect to its emitter resulting in a decrease in current through the transistors Q4, Q5, and Q6. The charging rate of capacitor C1 decreases, resulting in longer on time intervals for transistor Q1 and a corresponding increase in the average generator field power to the level required to return the generator voltage to its rated value.

Potentiometer R2 therefore controls the voltage output from the generator since the regulator apparatus acts to keep the voltage constant. Moving the slider of potentiometer R2 toward the positive end will result in an increase in the generator voltage output while moving the slider toward the negative end decreases the generator voltage. Resistor R8 serves to bias the reference diode D1 above its threshold or "knee" current even if transistor Q4 were biased completely off. Diode D2, shown connected between the generator field in the emitter electrode of transistor Q6 protects transistor Q6 from reverse voltage which results when transistor Q1 is gated off.

Since capacitor C1 is charged through transistors Q1 and Q6 it follows that the practical limit on the maximum capacitor charging current is the peak current rate of these transistors and not the minimum holding current of the four layer diode D3 as would be the case if the capacitor were charged directly from the generator, as is the case in a conventional relaxation oscillator. The minimum on time of the switching element Q1 is determined primarily by the switching times of the semiconductors, including the transistors and the four layer diode, and the allowable average switching dissipation increases as the frequency increases. The maximum on time is determined by the forward breakover or holding current of the four layer diode D3.

With the apparatus constructed as shown, no difficulty was experienced in obtaining on times for transistor Q1 from 0.1 millisecond to about three seconds with the fixed off time being set at about two milliseconds. With the types of components and their values as listed below, and particularly with the variations in the holding current of the four layer diode D3 from one part to another, the off time may vary in the range of from one to four milliseconds. This allowed the voltage output from the generator 10 to be regulated from 5 to 95 percent of the total generator voltage. Resistor R3 limits the current through transistor Q6 to allow the use of a low power transistor for this current control element.

Since transistors Q1 and Q2 are biased into saturation except when the four layer diode D3 is conducting, the regulator apparatus of this invention needs no auxiliary starting current to allow the voltage to build up from residual generator voltage when the generator is started initially.

The regulator apparatus of this invention also provides that the generator output will go to its minimum value in the event of failure since the most common failure mode is a shorting of an element. The shorting of either diodes D1 or D3 or transistors Q3, Q4, Q5, Q6 and Q7 will cause the regulated output to go to a minimum value. Only the shorting of transistors Q1 and Q2 will cause the output to go to its maximum.

Figure 3:
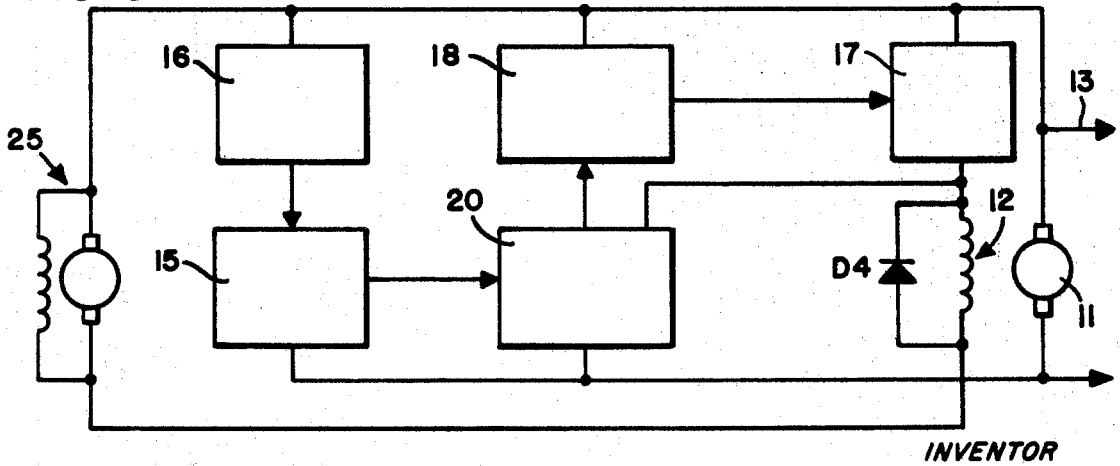
FIG. 3 is an electrical schematic diagram of the regulator apparatus of this invention for use with separately excited field windings on DC generators.

Reference is now made to FIG. 3 where common reference numerals are used to identify common components of the regulator apparatus. In FIG. 3, the current to the generator field winding is supplied by an external power supply 25. The difference between this circuit and the circuit shown in FIG. 2 is that the negative side of the generator field is connected to the exciter rather than to the negative terminal of the main generator.

FIG. 4 shows a circuit which may be used as a replacement for the four layer diode D3 in the event that these elements are unobtainable. The substitute circuit consists of a Zener diode D4, a silicon controlled rectifier SCR and a resistor R9 connected between the gate and cathode for bypassing the Zener diode leakage current. With a 9.1 volt Zener diode having a 0.1 milliamp knee current, a SCR having a one milliamp holding current and a 0.2 milliamp trigger current, and with R9 having a resistance of 470 ohms, the substitute circuit of FIG. 4 functions very similar to a four layer diode such as diode type 1N5160, M4L3054 (Motorola).

With reference now to FIG. 5, a more sophisticated and complete voltage regulator circuit is shown which includes a voltage spike suppression and line drop compensation. This circuit is particularly adapted for use in a ground power unit for aircraft. Generator current limiting circuits have been added to the basic regulator as well as a number of biasing and limiting resistors.

The voltage spike suppression circuit 27 includes capacitors C2 and C3, diode D5, and resistor R10. This circuit absorbs the voltage spikes, caused by exciter armature reactance, which would otherwise appear across transistors Q1 and Q2 when these transistors switch to the non-conducting state. Capacitors C2 and C3 charge rapidly through diode D5 and then discharge more slowly through resistor R10 which limits capacitor current to safe levels at high switching frequencies.

Line drop compensation is provided by subtracting the voltage drop across the generator interpole 28 winding from the sensing voltage through potentiometer R11. Since the interpole winding 28 drop and the generator output cable drop are both proportional to current, this current permits flat voltage regulation at the end of the cables by causing generator terminal voltage to rise by an amount equal to cable drop when a load is applied.

Generator current limiting is also derived from the generator interpole winding voltage drop. Part of this voltage is applied through resistors R12 and R13 to the base of transistor Q8. When the generator current reaches a magnitude such that the voltage between the generator positive brush and the slider potentiometer R13 exceeds the threshold voltage of transistor Q8, it conducts to cause current to flow through resistor R3 to the base of transistor Q5. This results in a decrease in regulator output and a steeply drooping generator output characteristic when the generator current exceeds a preset value. Capacitor C4 filters the base signal, and resistor R14 limits the current to transistor Q8 to a safe value.

Capacitor C5 is added to the base of transistor Q5 to reduce the effect of generator commutator ripple and brush arcing. Bias resistors R15, R16, R17 and R18 are added to compensate for transistor leakage currents at high temperatures. Rheostat R19 in the emitter circuit of transistor Q4 provides gain control for the system to allow adjustment of the closed loop stability. Diode D6 is placed between the collector and emitter elements of transistor Q6 to squelch any ringing which may occur with certain physical arrangement of component leads and with certain component values. This ringing may produce radio frequency signals which might interfere with aircraft radio equipment.

In a regulator for a 28 volt DC generator, as shown in FIG. 5, the values and types of components are as follows:

| Resistors | Value in ohms | Capacitors | Value |
|---|---|---|---|
| R1, R3 | 560 | C1 | 5 mfd |
| R2, R10 | 50 | C2, C3 | 10 mfd |
| R4, R15–R18 | 1K | C4 | 150 mfd |
| R5, R14 | 47 | C5 | 20 mfd |
| R6, R9 | 470 | | |
| R7, R8 | 2.2K | | |
| R11 | 5 | | Type |
| R12 | 20 | Diodes: | |
| R13 | 25 | D1 | 6.2 v. Zener |
| R19 | 5K | D2, D5 | 1N4820 |
| R20 | 68 | D4 | S2025 (Syntron) |
| R21 | 250 | Transistors: | |
| | | Q1 | 2N3773 |
| | | Q2–Q4, Q6, Q8 | MM4007 (Motorola) |
| | | Q5, Q7 | MM3007 (Motorola) |

Diode D4 is made by Syntron Company of Homer City, Pa., and transistors Q2–Q7 and diode D3 are produced by Motorola Semiconductor Products, Inc. of Phoenix, Ariz.

While a regulator apparatus has been described for use with a DC generator, the circuit described herein may also be used with AC generators with the addition of suitable circuitry and filters. Furthermore, the regulator circuit may be used to drive high power transistors or arrays of parallel transistors to control several kilowatts of power in the load circuit of transformer-rectifier welders, DC motor speed controls, static aircraft ground power units, or any other application where the control or regulation of DC voltage or current is required.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Voltage responsive apparatus for producing a square wave output comprising a first output of a constant time period, and a second output for a time period which is inversely proportional to a voltage input, said apparatus comprising
   a capacitor which charges at a rate proportional to the magnitude of the voltage input;
   voltage sensitive means responsive to the charge on said capacitor to conduct when the charge on said capacitor reaches a predetermined level,
   said voltage sensitive means providing a path for discharging said capacitor during the time said voltage sensitive means is conducting,
   said voltage sensitive means returning to a non-conducting state when the charge on said capacitor decreases below a predetermined level,
   output means responsive to said voltage sensitive means to provide a square wave output from said apparatus, said output means providing a first output for a constant period of time corresponding to the period when said voltage sensitive means is conducting, and providing a second output for a time period which is inversely proportional to the magnitude of the voltage input while said voltage sensitive means is in the non-conducting state,
   a source of reference voltage, and
   means comparing the voltage input to said reference voltage to produce flow of current which is proportional to the difference in voltages, and
   wherein said capacitor is operably connected to said comparing means and charges at a rate proportional to said flow of current.

2. The apparatus of claim 1 wherein said voltage sensitive means is four layer diode.

3. Voltage responsive apparatus for producing a square wave output comprising a first output of a constant time period, and a second output for a time period which is inversely proportional to a voltage input, said apparatus comprising
   a capacitor which charges at a rate proportional to the magnitude of the voltage input;
   voltage sensitive means responsive to the charge on said capacitor to conduct when the charge on said capacitor reaches a predetermined level, said voltage sensitive means including
   a Zener diode;
   a SCR having its gate electrode connected to the anode of said Zener diode, and its anode electrode connected to the cathode of said Zener diode;
   the anode electrode of said SCR being operably connected to said capacitor to sense the voltage thereon; and
   a resistor connected betwen the gate electrode and the cathode electrode of said SCR,
   said voltage sensitive means providing a path for discharging said capacitor during the time said voltage sensitive means is conducting,
   said voltage sensitive means returning to an non-conducting state when the charge on said capacitor decreases below a predetermined level, and
   output means responsive to said voltage sensitive means to provide a square wave output from said apparatus, said output means providing a first output for a constant period of time corresponding to the period when said voltage sensitive means is conducting, and providing a second output for a time period which is inversely proportional to the magnitude of the voltage input while said voltage sensitive means is in the non-conducting state.

4. Voltage responsive apparatus for producing a square wave output comprising a first output of a constant time period, and a second output for a time period which is inversely proportional to a voltage input, said apparatus comprising
   a capacitor which charges at a rate proportional to the magnitude of the voltage input;
   voltage sensitive means responsive to the charge on said capacitor to conduct when the charge on said capacitor reaches a predetermined level,
   said voltage sensitive means providing a path for discharging said capacitor during the time said voltage sensitive means is conducting,
   said voltage sensitive means returning to a non-conducting state when the charge on said capacitor decreases below a predetermined level, and
   output means responsive to said voltage sensitive means to provide a square wave output from said apparatus, said ouput means providing a first output for a constant period of time corresponding to the period when said voltage sensitive means is conducting, and providing a second output for a time period which is inversely proportional to the magnitude of the voltage input while said voltage sensitive means is in the non-conducting state,
   said output means includes a transistor having its gate electrode connected to said voltage sensitive means, and wherein said transistor is gated into the conducting state by said voltage sensitive means when the voltage on said capacitor increases above a first predetermined level, and wherein said transistor returns to the non-conducting state when the voltage on said capacitor decreases below a second predetermined level;
   said transistor providing a path for current flow through the base-emitter junction to discharge said capacitor during the time when said voltage sensitive means is in the conducting state.

5. A regulator apparatus for controlling the voltage output from a generator by controlling the current through the generator field winding, said apparatus including
   a source of reference voltage,
   comparator means for comparing the output voltage of the generator to said reference voltage, and
   means responsive to said comparator means for switching the current through the generator field winding at a rate such that the voltage output of said generator maintains a predetermined level as compared to said reference means,
   the improvement characterized by said switching means producing a square wave output having a constant off time and an on time which is inversely proportionate to the difference between the voltage output of the generator and said reference voltage, said switching means including
   a capacitor operably connected to the output of said comparator means which charges at a rate proportional to the difference between the voltage output of the generator and said reference voltage,
   voltage sensitive means responsive to the charge on said capacitor for conducting when said charge reaches a predetermined level,
   said voltage sensitive means providing a path for discharging said capacitor during the time said voltage sensitive means is conducting,
   said voltage sensitive means returning to the non-conducting state when the charge on said capacitor decreases below a predetermined level, and
   output means responsive to said voltage sensitive means and connected in the field winding of the generator to control the voltage output thereof, said output means being gated off for a constant period of time during the period when said voltage sensitive means is in the conducting state, and being gated on to allow current flow in the field winding during the period when said voltage sensitive means is in the non-conducting state.

6. The apparatus of claim 5 wherein said output means includes
a first transistor having its base electrode electrically connected to said voltage sensitive means, said transistor being gated into the conducting state when said voltage sensitive means conducts; and
a second transistor in the generator field winding circuit responsive to the status of said first transistor to conduct during those periods when said first transistor is in the non-conducting state, and to cease conducting when said first transistor is in the conducting state.

7. The apparatus of claim 5 further including means to interrupt the flow of current to said capacitor during the interval when said output means is gated off thus allowing said capacitor to discharge through said voltage sensitive means.

8. The apparatus of claim 5 wherein said voltage sensitive means is a four layer diode;
wherein said output means includes a first transistor having its base electrode connected to said four layer diode, said first transistor being gated into the conducting state by said diode when the voltage on said capacitor increases above the firing voltage of said diode, said first transistor returning to the non-conducting state when the voltage on said capacitor decreases below the holding current of said diode; and
a second transistor connected in series with the generator field winding and responsive to the status of said first transistor to conduct during those intervals when said first transistor is in the non-conducting state, and to be gated into the non-conducting state when said first transistor is in the conducting state; and
wherein said second transistor also supplies current to said capacitor so that the charging current to said capacitor is interrupted during those periods when the current flow is interrupted through said field winding.

References Cited

UNITED STATES PATENTS

| | | |
|---|---|---|
| 3,184,665 | 5/1965 | Wright. |
| 3,328,606 | 6/1967 | Pinckaers. |
| 3,360,713 | 12/1967 | Howell _____ 323—22 |
| 3,371,267 | 2/1968 | Motto _____ 322—28 |

ORIS L. RADER, Primary Examiner

H. HUBERFELD, Assistant Examiner

U.S. Cl. X.R.

322—36, 73; 323—22

PO-1050
(5/69)

UNITED STATES PATENT OFFICE
CERTIFICATE OF CORRECTION

Patent No. 3,525,924     Dated September 2, 1970

Inventor(s) Lawrence E. Atterholt

It is certified that error appears in the above-identified patent and that said Letters Patent are hereby corrected as shown below:

Column 5, between lines 18 and 19, insert

-- rating, since the average dissipation --.

SIGNED AND
SEALED

OCT 27 1970

(SEAL)
Attest:

Edward M. Fletcher, Jr.
Attesting Officer

WILLIAM E. SCHUYLER, JR.
Commissioner of Patents